United States Patent [19]

Stephens, Jr.

[11] 4,053,301
[45] Oct. 11, 1977

[54] PROCESS FOR THE DIRECT PRODUCTION OF STEEL

[75] Inventor: Frank M. Stephens, Jr., Lakewood, Colo.

[73] Assignee: Hazen Research, Inc., Golden, Colo.

[21] Appl. No.: 622,101

[22] Filed: Oct. 14, 1975

[51] Int. Cl.² ............................ C21C 5/52; C22B 1/10
[52] U.S. Cl. ........................................... 75/11; 75/26; 423/148
[58] Field of Search .................... 75/11, 26, 60, 32; 423/148

[56] References Cited

U.S. PATENT DOCUMENTS

| | | | |
|---|---|---|---|
| 228,329 | 1/1880 | Edison | 75/1 |
| 2,780,537 | 2/1957 | Stelling | 423/148 |
| 2,894,831 | 7/1959 | Old | 75/26 |
| 3,140,168 | 7/1964 | Halley | 75/26 |
| 3,364,009 | 1/1968 | Kemmetmüller | 75/25 |

Primary Examiner—P. D. Rosenberg

[57] ABSTRACT

A process for the direct production of steel from particulate iron oxides or concentrates including two major steps in which in Step (1) the iron oxides are converted to iron carbide and in Step (2) steel is produced directly from the carbide in the basic oxygen furnace or the electric furnace. In the production of the carbide the oxides are reduced and carburized in a single operation using a mixture of hydrogen as a reducing agent and carbon bearing substances such as propane primarily as carburizing agents. Iron carbide thus produced is introduced as all or part of the charge into a basic oxygen furnace to produce steel directly without the blast furnace step. In order to make the steel making process auto-thermal, heat is supplied either by using the hot iron carbide from Step (1) or preheating the iron carbide or by including sufficient fuel in the iron carbide to supply the required heat by combustion.

53 Claims, 1 Drawing Figure

SCHEMATIC FLOWSHEET FOR DIRECT STEELMAKING PROCESS

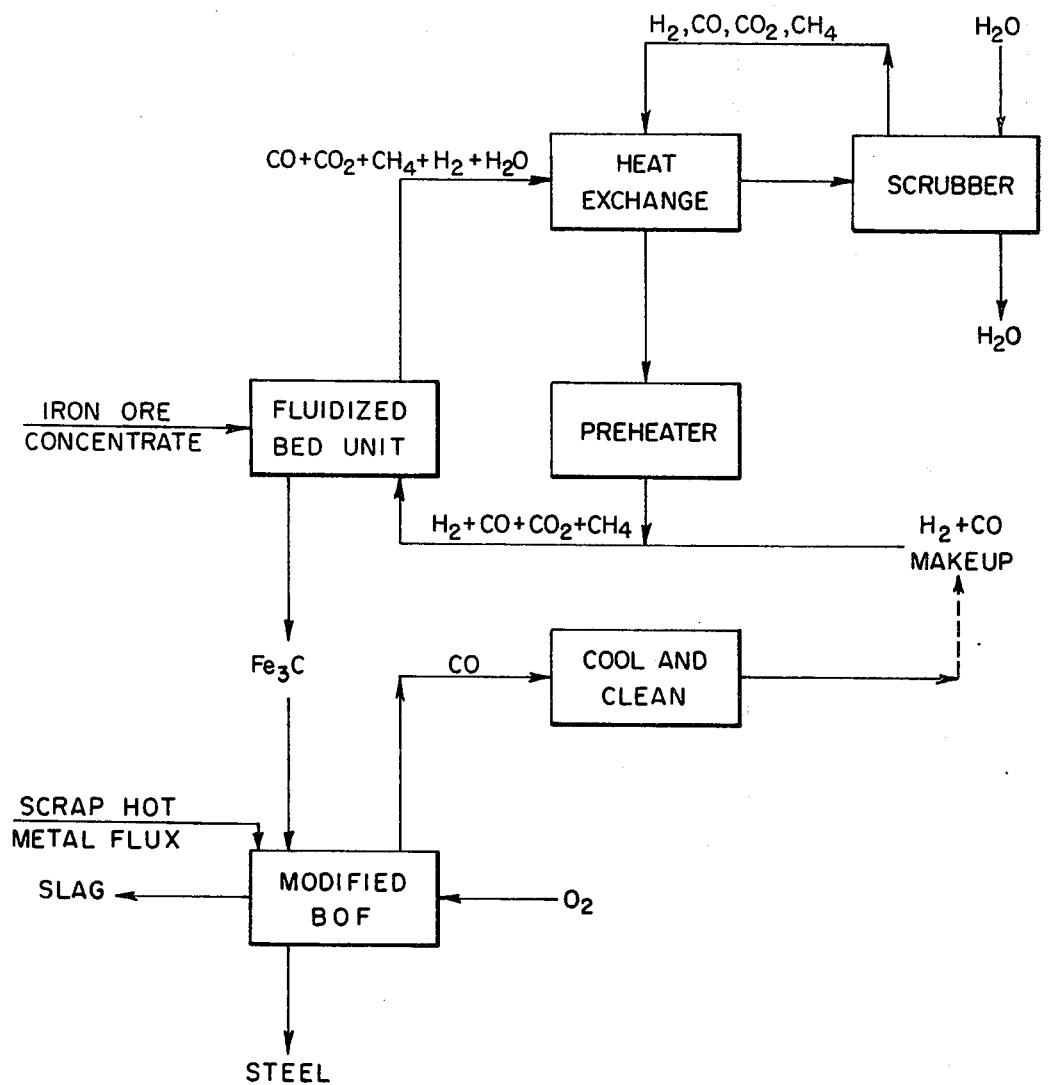
SCHEMATIC FLOWSHEET FOR DIRECT STEELMAKING PROCESS

4,053,301

PROCESS FOR THE DIRECT PRODUCTION OF STEEL

BACKGROUND OF THE INVENTION

1. Field of the Invention

The invention lies in the field of the pyrometallurgy of ferrous metals.

2. Description of the Prior Art

The increasing necessity of using low grade iron ores for making steel because of the depletion of high grade ores, and economic factors, have created a demand for reduction of the costs in producing steel from iron ore. Efforts to reduce costs have been directed to the elimination of the use of the highly fuel-consuming blast furnace. The present invention is directed to elimination of the use of the blast furnace by converting the iron oxide to the carbide followed by producing steel directly from the carbide in the basic oxygen furnace. The conversion of iron oxides to carbides for various purposes has received some attention in the past but there has been no known activity toward producing steel directly from the carbide in a basic oxygen furnace.

U.S. Pat. No. 2,780,537, the closest prior art known, discloses a process for converting iron oxides to carbides in a fluidized bed process in which carbon monoxide is used as the chief reducing and carburizing gas. The patent teaches that the reducing gas cannot contain hydrogen in an amount more than 50 percent by volume of the carbon monoxide content. It also refers to the prior art disclosing the use of hydrogen in a fluidized bed as a reducing gas for iron oxides having a low iron content. The reference alludes to use of the iron carbide product for making "metallic iron" and in an "iron production furnace" operating below the melting point of iron or steel, however, there is no teaching of use of the product for introduction into a fully molten steel system such as the basic oxygen furnace or electric furnace. Other somewhat remote prior art discloses processes for converting metallic iron to iron carbide rather than conversion of iron oxide to the carbide.

Still other prior art discloses fluid bed processes for the direct reduction of iron oxides to metallic iron which in turn could be further converted to carbide. However, these other direct reduction processes have the disadvantages that the product may be pyrophoric in some cases requiring briquetting, and stickiness is not completely eliminated in some processes so that difficulties arise with the fluid bed process.

It is an object of this invention to provide a process for making steel from iron oxide without the use of a blast furnace.

It is another object of this invention to provide a successful process for making steel from iron oxide by first converting the oxide to the carbide, followed by introducing the carbide directly into the basic oxygen furnace to produce steel.

SUMMARY OF THE INVENTION

A process for the direct production of steel from particulate iron oxides or concentrates which comprises (1) converting the oxides to iron carbide in a single step in a fluidized bed at low temperatures with a mixture of reducing and carburizing gases followed by (2) direct conversion of the carbide to steel in a basic oxygen or electric furnace.

The reducing and carburizing temperature of Step (1) cannot exceed about 1300° F with a preferred temperature range being about 900°–1200° F. The carburizing of the reduced iron to carbide may be conducted so that enough carbon is left in the iron carbide product to supply sufficient heat upon combustion in the basic oxygen furnace to make the process auto-thermal. The $CO/CO_2$ and hydrogen to water vapor ratios of the gases in the reaction of Step (1) are maintained at a point below which oxidation of iron carbide occurs.

Off-gases from the steel making step, about 90 percent carbon monoxide, may be circulated for use as part of the reducing gas for the reduction and carburizing step in the fluidized bed. Material balance calculations show that the carbon content of the off-gas is sufficient to supply all of the carbon necessary for the reduction and carburization step. Accordingly, when Steps 1 and 2 are performed in conjunction with each other as one continuous operation, all of the carbon necessary for Step 1, subject to slight operating losses, may be provided by continuous cycling of the off-gas from Step 2 to Step 1. This eliminates the necessity for adding carbon to Step 1 with the exception of small losses occurring in normal operations. The result is that the carbon originally added to Step 1 to make iron carbide may be used over and over by recovering it in Step 2 in the off-gas as steel is produced and reusing it in Step 1 to make more carbide. When the steps are performed in conjunction with each other added heat is not required to make the process auto-thermal, as the product going directly from Step 1 to Step 2 is at a temperature which eliminates the necessity for adding heat. When Steps 1 and 2 are performed separately then the hot off-gas from Step 2 may be used for preheating iron carbide or heat added by other means as necessary to make the steel making process auto-thermal.

The iron carbide produced in Step 1 is added directly as the charge to the basic oxygen or electric furnace along with fluxing agents, alloying material and other conventional additives to produce steel directly with elimination of the conventional blast furnace step. Heat is supplied to the charge when necessary in various ways to make the process auto-thermal. These ways may include direct heating, addition of fuel such as carbon, or producing sufficient free or combined carbon in the carbide as it is produced, or others. Sensible heat from the off-gas of the BOF may be used and the off-gas may be partially burned to provide heat to the charge. If the latter is done the $CO/CO_2$ ratio in the combustion gases must be maintained below that at which iron carbide will decompose at the required preheat temperature.

BRIEF DESCRIPTION OF THE DRAWING

The single drawing is a schematic flowsheet for the direct steel making process of the invention.

DESCRIPTION OF PREFERRED EMBODIMENTS

The invention will be described in detail in conjunction with the accompanying drawing.

The basic oxygen and electric furnace processes referred to herein for making steel are well known in the prior art. The basic oxygen process or basic oxygen furnace process differs chiefly from Bessemer converters and open hearth furnaces in that the reactant used to oxidize the carbon and certain impurities (sulfur, phosphorus, etc.) in the charge is not air, but oxygen. The oxygen is introduced by blowing it with a lance onto or below the surface of the molten iron.

The iron carbide produced by the process described herein is a mixture of carbides having the molecular formulas $Fe_2C$ and $Fe_3C$ with the $Fe_3C$ content being predominant.

The fluidized bed reactor referred to herein is of the conventional type in which finely divided feed material on a grate or other perforate support is fluidized by upwardly flowing gases which may include or entirely comprise the reactant gases. Auxiliary equipment includes heating and temperature control and monitoring equipment, heat exchangers, scrubbers, cyclones, gas cycling equipment, and other conventional equipment. Some of this auxiliary equipment is shown schematically in the flowsheet.

In this specification and the claims the reduction and carburization step is referred to as Step 1 and the steel making step as Step 2. The term "hydrogen bearing gas" includes hydrogen gas alone and the term "carbon containing material" includes carbon alone.

be used so long as they supply carbon to form iron carbide.

By proper balancing of the ratios of the hydrogen and carbon bearing materials, it is possible to restrict the hydrogen to a reducing function and the carbon to a carburizing function. This can readily be done by maintaining quantities of hydrogen bearing gases which are in excess of the quantities of the carbon bearing gases.

Because of the equilibrium conditions involved in hydrogen-carbon-oxygen gas systems, the required hydrogen-carbon ratios will automatically require that methane be present in the gas system. The quantity of methane present will be a function of carbon to hydrogen ratios, as well as temperature and pressure conditions.

Representative tests and results from an extensive test program using the reduction and carburization procedure described above in a fluid bed reactor are presented in the following Table I.

TABLE I

EXAMPLES OF $Fe_3C$ PRODUCTION

| Test No. FB— | Type of Ore | Mesh Size Ore | Feed Rate g/min | Gas Additions | | | Temp °F | Off-gas Analysis* | | | | | Product %C | Remarks |
| | | | | $H_2$ l/min | $C_3H_8$ l/min | $N_2$ l/min | | $H_2$ % | $N_2$ % | $CH_4$ % | $CO$ % | $CO_2$ % | | |
| --- | --- | --- | --- | --- | --- | --- | --- | --- | --- | --- | --- | --- | --- | --- |
| 30 | Hematite | −20+100 | 0 | 2.5 | 1.0 | 0.5 | 1168 | 77.0 | 0.5 | 6.3 | 8.9 | 2.0 | 4.35 | Final red in reactor 5.02% C |
| 36 | Hematite | −20+100 | 0 | 2.5 | 1.0 | 0.5 | 1170 | 72.0 | — | 5.2 | 13.2 | 2.9 | 5.02 | Good clean $Fe_3C$ produced |
| 37B | Hematite | −20+100 | 0 | 2.5 | 1.0 | 0.5 | 1018 | 72.1 | — | 6.5 | 7.8 | 3.4 | 8.96 | Good $Fe_3C$ saturated with excess C |
| 38B | Hematite | −20+100 | 0 | 2.5 | 1.0 | 0.5 | 1081 | 72.6 | — | 6.4 | 10.6 | 4.0 | 4.94 | Good $Fe_3C$ |
| 39B | Hematite | −20+100 | 0 | 2.5 | 1.0 | 0.5 | 1108 | 69.3 | — | 7.9 | 12.2 | 4.4 | 4.67 | Good $Fe_3C$ |
| 40 | Hematite | −20+100 | 2.7 | 2.5 | 1.0 | 0.5 | 1112 | 62.5 | — | 6.7 | 16.1 | 6.7 | 4.77 | Good $Fe_3C$ |
| 41B | Magnetite | −20+100 | 0 | 2.5 | 1.0 | 0.5 | 1103 | 67.5 | — | 6.0 | 11.6 | 3.9 | 4.69 | Good $Fe_3C$ |
| 41C | Magnetite | −325 | 3.8 | 2.5 | 1.0 | 0.5 | 1130 | 58.3 | — | 6.1 | 21.4 | 6.8 | 5.42 | Good $Fe_3C$ |

*The balance of gas is water vapor.

Step 1 of the overall process is the conversion of the oxides in the iron ore concentrate to iron carbide in the fluidized bed unit shown in the flowsheet. The conversion process must be carefully controlled to provide a product suitable for use in the basic oxygen or electric furnace. The iron carbide is desirable for use in these processes because it is non-pyrophoric and resistant to weathering which permits transport for long distances and storage for reasonable periods.

The oxides are reduced to iron and the iron converted to the carbide in a continuous process in the fluid bed reactor in which the reducing the carburizing gases are added together. In order to prevent any sticking caused by the transient presence of metallic iron the temperature is maintained below about 1300° F at all times and preferably in the range of about 900°–1200° F.

Hydrogen is preferably used as the reducing gas although carbon monoxide or hydrocarbon gases or mixtures of hydrogen with CO and hydrocarbon gases may be used. The flowsheet shows the use of hydrogen and carbon monoxide with water being given off. Hydrogen is preferred as the reducing gas because the oxidation product of hydrogen, which is water, may be easily removed from the furance off-gas thus permitting recycling of the balance of the gas without the need for extensive complicated and expensive chemical systems for removing the oxidation products of carbon which are carbon monoxide and carbon dioxide when carbon containing reducing gases are used.

The preferred carburizing gas which is mixed with the reducing gas is propane, although carbon monoxide or other hydrocarbon gases, or solid carbon, may be used with the lower alkyl hydrocarbon gases being preferred. A wide range of carbonaceous materials may The carbon content in the final product varies as the percent iron oxide in the feed materials varies. Lower grade ores with lower iron contents will automatically yield products with lower carbon contents.

The volume of hydrogen in the hydrogen-carbon monoxide reducing and carburizing mixture in the fluidized unit should exceed the volume of carbon monoxide, the preferred amount of hydrogen being over about 60 percent by volume of the carbon monoxide present.

The results show production by Step 1 of the process of clean iron carbide which is highly suitable for use in the basic oxygen or electric furnace. X-ray diffraction analysis showed the carbon to be present as iron carbide with no free carbon or metallic iron. The product was found to be nonpyrophoric. Simulated weathering tests showed that the product was stable in oxidizing atmospheres containing water vapor up to a temperature of 250° C.

The results also show that Step 1 of the process is highly successful in producing iron carbide directly from iron oxides when operated within temperature ranges of about 1020° F – 1170° F using hydrogen to water vapor ratios between 5 to 1 and 8 to 1 and CO/$CO_2$ ratios between about 1 to 1 and 5 to 1. As stated herein, Step 1 can be successfully operated within a temperature range of about 900°–1300° F, a hydrogen to water vapor ratio of about 2.5 to 1 to about 8 to 1 and a CO/$CO_2$ ratio of about 1 to 1, up to about 4 to 1. Under these conditions, methane will be present in quantities ranging from 1 to 70 percent by volume of the gas system containing the prescribed amounts of hydrogen, water vapor, CO, and $CO_2$. It was found that Step 1 would not operate outside these ranges to successfully produce iron carbide.

Step 2 of the overall process is the conversion of the iron carbide to steel in the basic oxygen furnace. Because of the nature of the basic oxygen furnace process, special conditions apply to the processing of iron carbide to steel by this process as compared to other steel making processes in furnaces.

If Steps 1 and 2 are close-coupled so that the iron carbide comes out of the fluid bed unit at an elevated temperature of about 1100°–1300° F and at that temperature is added directly to the basic oxygen furnace, then the heat calculations show that no added heat is required and the process is continuous and auto-thermal.

The modification shown in the flowsheet wherein the off-gases are being sent directly to the fluidized bed unit is used when Steps 1 and 2 are close-coupled in time. In this modification of the process substantially all of the carbon used in the fluidized bed unit to convert the oxides to iron carbide is recovered as CO in the furnace and recycled to the fluidized bed unit to be reused in again making iron carbide.

If for purposes of transport or storage the Step 1 product becomes or is cooled before Step 2, then heat must be readded either in the form of reheating the product or adding extra fuel to Step 2.

Heat balance calculations show that at ambient temperature iron carbide does not contain sufficient fuel value so that the reaction taking place in the basic oxygen furnace is autothermal without adding heat to the charge.

The additional heat required to make the reaction self-sustaining may be supplied in a number of ways. The off-gas from the basic oxygen furnace produced by the processing of iron carbide contains about 90 percent carbon monoxide in addition to substantial sensible heat. The sensible heat may be used through heat exchangers or otherwise to heat the incoming iron carbide. By burning part of the off-gas, sufficient heat is achieved for augmenting the sensible heat to effect the required preheating of the incoming iron carbide charge to make the process auto-thermal. Under some conditions the sensible heat alone is sufficient. The heat for the preheating can be obtained entirely from combustion of the off-gas. The preferred preheat temperature range is from about 1300° F to about 2000° F.

Tests conducted with iron carbide in a gaseous medium simulating that of the combustion products from partial combustion of the off-gas showed that the iron carbide is not only stable under these conditions but actually increased in carbon content from 5.9 to 7.1 percent due to the formation of the $Fe_2C$ carbide from the normally predominant $Fe_3C$. To achieve this result the $CO/CO_2$ ratio in the combustion gas must be between 1 to 1 and 2 to 1 when attaining preheat temperatures of 900°–1300° F.

Added heat to make the process auto-thermal can be supplied wholly or in part by direct heating of the $Fe_3C$ charge with an external heat source. Sufficient carbon may be added to the iron carbide to provide the required additional heat by combustion during the process. The amount of carbon added varies from about 3 to 5 weight percent of the iron carbide charge. The carbon may be added directly to the iron carbide by preheating the iron carbide in carbon bearing gases having a $CO/CO_2$ ratio greater than 1 to 1.

Heat may be supplied by reaction of the basic oxygen furnace off-gas with incoming iron carbide. The necessary carbon content of the iron carbide to furnish the required heat upon combustion can be supplied during Step 1 of the process described above by adjusting the content of the carbonaceous material in the reacting gas mixture of the fluidized bed to provide for the production of sufficient $Fe_2C$ in the $Fe_3C$ product. As shown in the flowsheet, hot scrap metal may be added to the basic oxygen furnace charge.

Step 2 of the process may also include the addition of pig iron carbide charge in the basic oxygen and electric furnaces. A significant advantage of this feature is that iron carbide can then be added for cooling in an amount three times that of scrap iron which can be added to conventional basic oxygen furnace processes for cooling. Iron carbide for this purpose can be added in an amount up to about 60 percent by weight of the iron carbide-pig iron charge. One advantage of this is that present pig iron furnaces can be continued in operation in conjunction with the present process.

The invention includes all of the above procedures alone or combined for providing the necessary heat for the iron carbide charge to make the reaction in the basic oxygen furnace auto-thermal.

If Step 2 is conducted in the electric furnace, any extraneous heat required may be supplied by means of the electrical energy normally used in this type of furnace.

Step 1 of the process provides a convenient and effective means for concentrating low grade non-magnetic ores to separate the iron ore from the gangue. As the iron carbide produced from non-magnetic ores is magnetic it is only necessary to process non-magnetic ore, such as, oxidized taconites, in accordance with Step 1 to convert the iron oxide therein to iron carbide and subject the treated ore to magnetic separation to separate the magnetic iron carbide from the gangue. The iron carbide recovered may then be used in Step 2 of the process of the invention.

A number of advantages of the invention are apparent from the above description. Its principal advantage is that it eliminates the expensive intermediate blast furnace step in converting iron ore to steel. When the two steps are performed in conjunction no added heat is necessary for the second step and carbon monoxide from the second step provides the necessary carbon for carbonization of reduced iron in the first step so that the carbon can be reused continuously in both steps. Step 1 includes the production of water as a by-product, thus simplifying the recovery of by-product carbon containing gases. This step can be performed to give a product having a high enough ratio of $Fe_2C$ to $Fe_3C$ to provide a high enough carbon content in the charge for the basic oxygen furnace to make the steel making process auto-thermal.

Advantages of Step 2 are that it provides sources of heat for making this step auto-thermal without the use of extra materials, i.e., sensible heat from the off-gases can be used or the CO in the off-gases can be burned to provide the necessary heat, or the CO can be reacted with the iron carbide from Step 1 to raise the ratio of $Fe_2C$ to $Fe_3C$ in the charge so that sufficient carbon will be available for combustion to supply the augmenting heat to make Step 2 auto-thermal. When pig iron is added to the charge, large amounts of iron carbide can be added for cooling. The overall process is practically pollution-free and provides for maximum conservation and reuse of non-product reactants. A further advantage of the overall process is that it results in a saving in transportation costs when the carbide is made near the mine before transport to the steel making furnace as iron carbide represents a higher percentage of usable material than the oxide.

What is claimed is:

1. A process for the direct production of steel from iron oxides which comprises:
   a. converting the iron in the oxides to iron carbide; and
   b. converting the iron in the iron carbide directly to steel in the basic oxygen furnace.

2. The process of claim 1 in which in step (b) the conversion is accomplished by oxidizing the carbon in the iron carbide to carbon monoxide with the heat released thereby providing heat for operation of the basic oxygen furnace.

3. A process for the direct production of steel from iron oxides which comprises:
   a. reducing the oxides and converting the iron to iron carbide in one step in a fluidized bed with a mixture of hydrogen bearing gas and a carbon containing material which provides carbon for the iron carbide, the hydrogen being present in an amount exceeding 50% of the CO present; and
   b. adding the iron carbide to a basic oxygen furnace and processing it to steel by the basic oxygen furnace process without the addition of external heat.

4. The process of claim 3 in which steps (a) and (b) are performed in conjunction and the iron carbide of step (a) is added directly to the basic oxygen furnace without substantial heat loss so that the process is auto-thermal.

5. The process of claim 4 in which the iron carbide is at a temperature between about 900° F to 1300° F when it leaves step (a).

6. The process of claim 4 in which off-gas is cycled from step (b) to step (a).

7. The process of claim 6 in which the off-gas provides substantially all of the carbon for step (a).

8. The process of claim 3 in which in step (a) the ratio of hydrogen to formed water in the reaction medium of the fluidized bed is maintained from about 2.5 to 1 to about 8 to 1 and the $CO/CO_2$ ratio is maintained from about 1 to 1 to about 4 to 1, the prescribed $CO/CO_2$-hydrogen/$H_2O$ ratios being essentially in equilibrium with methane.

9. The process of claim 3 in which the volume of hydrogen exceeds the volume of CO in said fluidized bed.

10. The process of claim 3 in which the carbon containing material is solid carbon.

11. The process of claim 3 in which the carbon containing material is lower alkyl hydrocarbon gas.

12. The process of claim 11 in which the gas is propane.

13. The process of claim 8 in which the temperature of the reaction gas mixture is between about 900° F and 1300° F.

14. The process of claim 3 in which the iron carbide of step (a) has lost heat before step (b) is performed and sufficient heat in a preheat step is added to it for step (b) to render the reactions occurring in the conversion of the iron carbide to steel in the basic oxygen furance auto-thermal.

15. The process of claim 14 in which the iron carbide charge is preheated to a temperature between about 1300° F and about 2000° F.

16. The process of claim 14 in which at least part of the heat for the preheat step is derived from off-gases from step (b).

17. The process of claim 14 in which at least some of the heat for the preheat step is derived from sensible heat in the off-gases.

18. The process of claim 14 in which at least some of the heat for the preheat step is derived from combustion of CO in the off-gases.

19. The process of claim 18 in which the $CO/CO_2$ ratio in the gas combustion products is maintained from about 1:1 to about 2:1 when attaining preheat temperatures of 900°–1300° F.

20. The process of claim 14 in which the heat for the preheat step is provided by reacting at least part of the off-gas to produce $Fe_2C$ in the iron carbide from step (a).

21. The process of claim 20 in which the composition of the reactive medium of step (a) is adjusted to provide the required amount of $Fe_2C$ in the iron carbide charge.

22. The process of claim 3 in which the iron carbide of step (a) has lost heat before step (b) is performed and sufficient fuel is added to it to provide additional heat upon combustion in the process to render the reactions occurring in the conversion of the iron carbide to steel in the basic oxygen furnace autothermal.

23. The process of claim 22 in which the fuel is carbon.

24. The process of claim 23 in which the carbon is added in an amount from about 3 to 5 weight percent of the iron carbide charge.

25. The process of claim 23 in which the carbon is added directly to the iron carbide charge.

26. The process of claim 3 in which molten pig iron is added to the iron carbide charge in step (b) and iron carbide is used to control the temperature of the melt.

27. The process of claim 26 in which the temperature controlling iron carbide is added in an amount up to about 60 weight percent of the iron carbide-pig iron charge.

28. A process for conversion of iron oxides to iron carbide which comprises reducing the oxides and converting the iron to iron carbide in one step in a fluidized bed with a mixture of hydrogen and a carbon containing material which provides carbon for the iron carbide, the mixture containing hydrogen in an amount over 60 percent by volume of the carbon monoxide present.

29. The process of claim 28 in which the ratio of hydrogen to formed water in the reaction medium of the fluidized bed is maintained from about 2.5 to 1 to about 8 to 1 and the ratio of $CO/CO_2$ is maintained from about 1 to 1 to about 4 to 1, the prescribed $CO/CO_2$-hydrogen/$H_2O$ ratios being essentially in equilibrium with methane.

30. The process of claim 28 in which the carbon containing material is solid carbon.

31. The process of claim 28 in which the carbon containing material is a lower alkyl hydrocarbon gas.

32. The process of claim 31 in which the gas is propane.

33. The process of claim 28 in which the temperature of the mixture is between about 1100° F and about 1300° F.

34. A process for converting iron carbide to steel in the basic oxygen furnace by the basic oxygen furnace process, said process comprising the step of augmenting the heat produced in the conversion process which is produced by oxidizing the carbon in the iron carbide, with additional heat, to make the process in the basic oxygen furnace autothermal.

35. The process of claim 34 in which the heat is added in a preheat step.

36. The process of claim 35 in which the temperature of the iron carbide charge is between about 1300° F and about 2000° F before it is added to the basic oxygen furnace.

37. The process of claim 35 in which the preheat step is performed by directly heating the iron carbide charge.

38. The process of claim 35 in which at least some of the heat for the preheat step is derived from sensible heat in the off-gases.

39. The process of claim 35 in which at least some of the heat for the preheat step is derived from combustion of CO in the off-gases.

40. The process of claim 39 in which the $CO/CO_2$ ratio in the gas combustion products is maintained from about 1:1 to about 2:1 when attaining preheat temperatures of 900°–1300° F.

41. The process of claim 35 in which the heat for the preheat step is provided by reacting at least part of the off-gas with the iron carbide from step (a) to produce $Fe_2C$.

42. The process of claim 34 in which said heat is augmented by adding a fuel to the iron carbide charge for combustion during the conversion step.

43. The process of claim 42 in which sufficient fuel is added to the charge to provide additional heat upon combustion in the process to raise the temperature of the charge to at least about 1100° F.

44. The process of claim 42 in which the fuel is carbon.

45. The process of claim 44 in which the carbon is added in an amount from about 3 to 5 weight percent of the iron carbide charge.

46. A process of making steel from iron carbide in the basic oxygen furnace which comprises adding pig iron to the iron carbide charge and controlling the temperature of the charge by the addition of iron carbide.

47. The process of claim 46 in which the pig iron is added in an amount up to about 40 weight percent of the charge and the temperature controlling iron carbide is added in an amount up to about 60 weight percent of the iron carbide-pig iron charge.

48. A process for concentrating non-magnetic low grade iron ores which comprises converting the iron oxide in the ores to iron carbide and separating the iron carbide and gangue by subjecting the treated ores to magnetic separation.

49. The process of claim 48 in which the iron oxides are converted to iron carbide in one step in a fluidized bed with a mixture of hydrogen bearing gas and a carbon containing material which provides carbon for the iron carbide.

50. The process of claim 49 in which hydrogen is present in an amount of over 60 percent by volume of carbon monoxide in the fluidized bed.

51. A process for the direct production of steel from iron oxides which comprises:
 a. converting the iron in the oxides to iron carbide; and
 b. converting an iron in the iron carbide directly to steel in an electric furnace.

52. A process for the direct production of steel from iron oxides which comprises:
 a. reducing the oxides and converting the iron to iron carbide in one step in a fluidized bed with a mixture of a hydrogen bearing gas and a carbon containing material which provides carbon for the iron carbide, the hydrogen being present in an amount exceeding 50% of the CO present; and
 b. adding the iron carbide to the electric furnace and processing it to steel in an electric furnace.

53. The process of claim 52 in which steps (a) and (b) are performed in conjunction and the iron carbide produced in step (a) is added directly to the electric furnace without substantial heat loss.

* * * * *